UNITED STATES PATENT OFFICE.

JOSHUA T. SMITH, OF COFFEE COUNTY, GEORGIA.

ANTIDOTE.

SPECIFICATION forming part of Letters Patent No. 379,183, dated March 6, 1888.

Application filed October 11, 1887. Serial No. 252,020. (No specimens.)

*To all whom it may concern:*

Be it known that I, JOSHUA THOMAS SMITH, of the county of Coffee, with post-office address at Hazlehurst, in the county of Appling and State of Georgia, have invented a new and useful Medical Compound, to be used for the treatment of serpent and other venomous bites, of which the following is a specification.

My composition consists of the following ingredients, combined in substantially the proportions stated, viz: alcohol, one quart; gall of the earth, (*Nabalus Fraseri*,) herb, two ounces; mohawk, also known as rattlesnake-weed, (*Hieracium venosum*,) one ounce; alum, one-fourth of an ounce; tincture of iodine, thirty-two drops. These ingredients are mixed together and allowed to stand about fourteen days, when the compound is filtered and is ready for use.

In using the above-described composition I administer one wine-glass every hour until the pain ceases, then every three or four hours until cured.

The composition compounded as described acts as a powerful arterial stimulant and operates to counteract the poison, and in practice has been found especially useful in the treatment of rattlesnake bites; but manifestly it may be used for the treatment of the bites or stings of other snakes, reptiles, or for the treatment of the stings of venomous insects.

Having thus described my invention, what I claim as new is—

The herein-described composition of matter to be used in the treatment of venomous bites and stings, consisting of alcohol, gall of the earth, mohawk, alum, and tincture of iodine, in about the proportions specified.

JOSHUA T. SMITH.

Witnesses:
 GEO. W. TAYLOR,
 W. M. DENTON.